April 29, 1952  F. SCHAFER  2,594,351
METHOD OF MAKING MATCH SPLINTS
Filed May 19, 1948
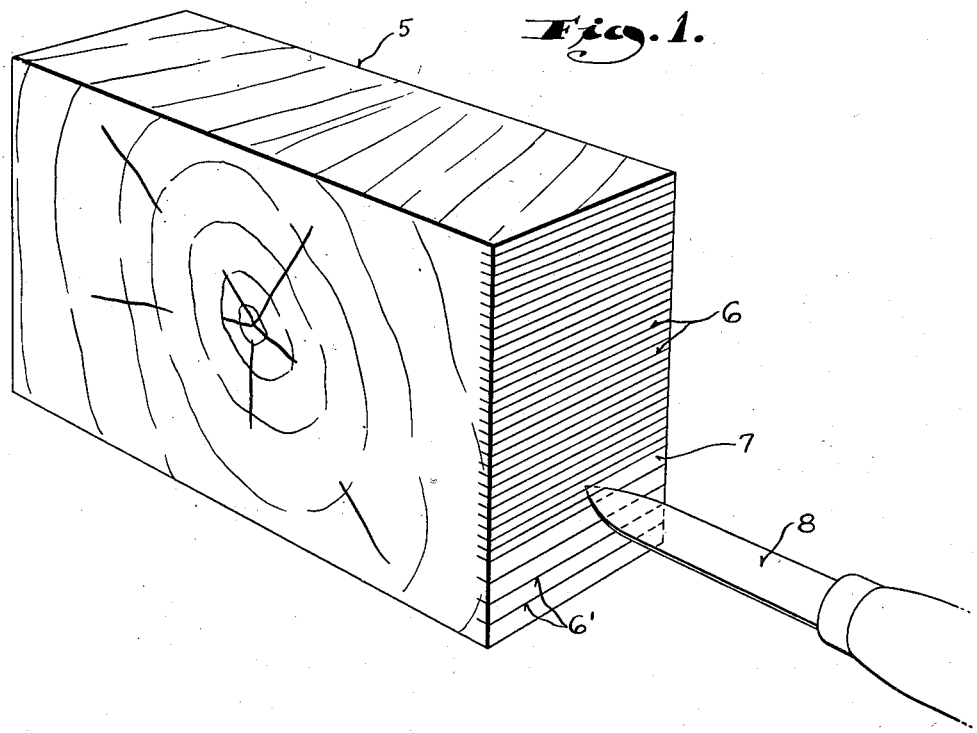
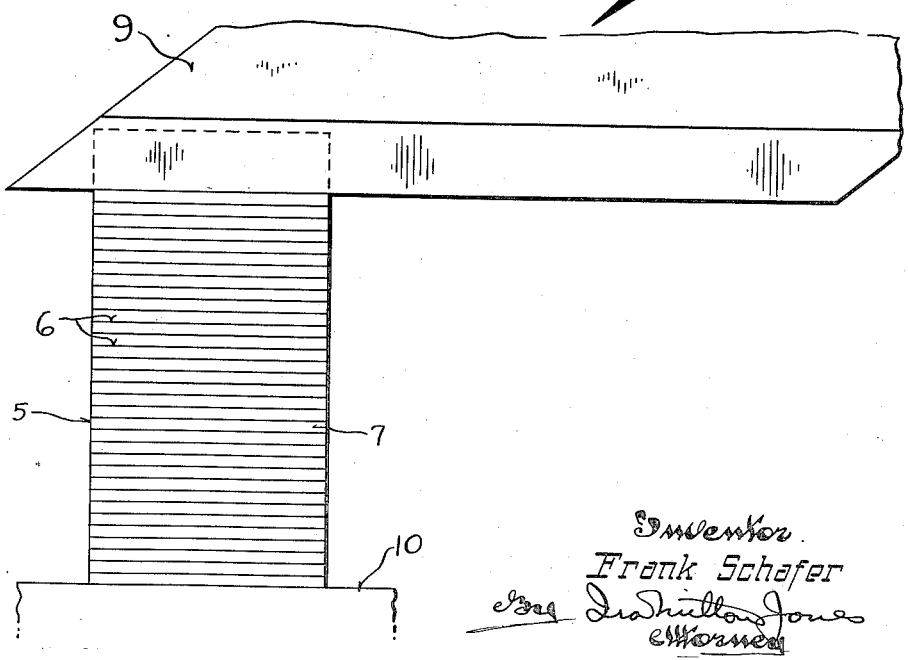
Inventor
Frank Schafer Patented Apr. 29, 1952

2,594,351

UNITED STATES PATENT OFFICE 2,594,351

METHOD OF MAKING MATCH SPLINTS

Frank Schafer, Oshkosh, Wis., assignor to The Bell Machine Company, Oshkosh, Wis., a corporation of Wisconsin Application May 19, 1948, Serial No. 27,972

4 Claims. (Cl. 144—309)

This invention relates to the manufacture of wooden match splints or sticks. Heretofore match splints or sticks were cut from veneer produced by spirally turning sheets from log-like pieces of stock. As distinguished from such past practice the present invention contemplates a method of making match splints or sticks from blocks of wood of a size ordinarily considered scrap.

With the above and other objects in view, which will appear as the description proceeds, this invention resides in the novel method and procedure substantially as hereinafter described, and more particularly defined by the appended claims, it being understood that such changes in the precise embodiment of the hereindisclosed invention may be made as come within the scope of the claims.

The accompanying drawing illustrates one way of practicing the method of the invention, and in which:

Figure 1 is a perspective view illustrating one step in the method of this invention; and Figure 2 is a side elevational view illustrating the next successive step of the method.

The two views of the drawing illustrate substantially the entire method. The first step in this method is to cut a block of wood 5 to substantially oblong shape with its with-the-grain dimension equal to the desired length of the splints or sticks to be cut. The other dimensions of the block may vary and are determined purely from considerations of convenience in handling and availability of stock.

With the block thus precut the next step in the method consists in cutting a series of parallel slits 6 in one face 7 of the block. The slits 6 are cut with the grain, and considering the block as having been cut from a board, the face 7 preferably would be the edge of the board.

A knife 8 or gang of knives acting together may be used to cut the slits 6. They are spaced apart a distance equal to the desired width of the splint or stick and cut to a depth at least equal to the desired thickness of the splints or sticks.

While the slits 6 may be cut successively one after the other it is preferable to first make alternate slits as shown at 6' in Figure 1 and then repeat the slitting operation with the second series of slits lying between those already cut and equispaced therefrom. Cutting the slits in this alternate manner assures a better product and if gang knives are used to cut a number of slits simultaneously, cutting them alternately in this manner reduces the force required to make the cuts.

After the entire face 7 has been slitted in the manner described the slitted portion of the block is sliced off, preferably by means of a guillotine blade 9, the edge of which is parallel with the slits as shown in Figure 2. In this operation the block 5 is supported on a table 10 and the blade 9 is constrained to movement in a plane normal to the table 10 and parallel to the face 7. The cut made by the blade should be spaced back from the face 7 a distance equal to the desired thickness of the finished splints and as shown in Figure 2 it is preferable to have the blade 9 move obliquely across the face of the block as indicated. In this manner a slicing action rather than a direct shearing action is effected, and by virtue of the fact that the edge of the blade 9 is parallel with the slits each successive splint is severed from the block without any tendency to bend the splint, a condition which would be met if the knife edge were not parallel with the slits. The number of individual splints or sticks obtained with one stroke of the blade 9 depends upon the height of the block, and as will be readily apparent the slitting of the face 7 is conducted alternately with the slicing off of the slitted portion until the entire block has been cut into splints or sticks.

It will also be apparent to those skilled in the art that the method of this invention materially simplifies the cutting of match splints or sticks, and by virtue of the fact that it enables the use of otherwise scrap wood has a decided economic advantage over past methods.

What I claim as my invention is:

1. The hereindescribed method of making wooden match splints which comprises: cutting in one face of a block of wood a plurality of slits running with-the-grain and spaced apart a distance equal to the combined width of a plurality of match splints and to a depth equal to the desired thickness of an individual match splint; cutting a plurality of similar slits in said face of the block between the first slits and parallel thereto and so spaced from said first cut slits and from one another that the distance between any two slits is equal to the desired width of an individual match splint; and slicing off said slitted portion of the block parallel to said face and spaced back therefrom a distance equal to the desired thickness of an individual match splint.

2. The hereindescribed method of making wooden match splints which comprises: simultaneously cutting a number of parallel slits across one face of a block of wood to a depth at least equal to the desired thickness of the splints and with the slits spaced apart a distance equal to twice the desired width of the splints; simultaneously cutting a number of similar slits in the same face of the block between and equispaced from the first cut slits; and after the entire face of the block is thus slitted, slicing off the slitted portion a distance back from said face equal to the desired thickness of the individual splints.

3. The hereindescribed method of making wooden match splints which comprises: cutting a block of wood so that its with-the-grain dimension equals the desired length of the splints; cutting parallel slits with-the-grain entirely across one face of the block to a depth not less than the desired thickness of the splints and with said slits spaced apart a distance equal to the desired width of the individual splints; and slicing off the slitted portion of the block parallel to said face thereof and in therefrom a distance equal to the desired thickness of the splints with the slicing cut at all times parallel to and successively crossing the slits and progressing obliquely across the block along a plane parallel to the slitted face of the block.

4. The hereindescribed method of making splints suitable to be used as match sticks which comprises: cutting parallel slits entirely across one face of a block of suitable material, with the slits spaced apart the desired width of the individual splints and to a depth at least equal to the desired thickness of the individual splints; and slicing off the slitted portion of the block at a distance back from said face thereof equal to the desired thickness of the splints with the slicing cut at all times parallel to and successively crossing the slits and progressing obliquely across the block along a plane parallel to the slitted face of the block.

FRANK SCHAFER.

REFERENCES CITED

The following references are of record in the file of this patent:

UNITED STATES PATENTS

| Number | Name | Date |
|---|---|---|
| 295,173 | Hill | Mar. 18, 1884 |
| 1,332,477 | Sturm | Mar. 2, 1920 |
| 1,663,978 | Friede et al. | Mar. 27, 1928 |
| 2,058,207 | Begle | Oct. 20, 1936 |